United States Patent
Lau et al.

(10) Patent No.: US 7,593,531 B2
(45) Date of Patent: Sep. 22, 2009

(54) METHODS AND SYSTEMS FOR TRANSCEIVING CHAOTIC SIGNALS

(75) Inventors: Chung-Ming Lau, Hong Kong (CN); Chi-Kong Tse, Hong Kong (CN)

(73) Assignee: The Hong Kong Polytechnic University, Hong Kong Sar (CN)

( * ) Notice: Subject to any disclaimer, the term of this patent is extended or adjusted under 35 U.S.C. 154(b) by 870 days.

(21) Appl. No.: 10/840,601

(22) Filed: May 7, 2004

(65) Prior Publication Data
US 2005/0249271 A1 Nov. 10, 2005

(51) Int. Cl.
*H04L 9/00* (2006.01)
(52) U.S. Cl. ...................................... 380/263
(58) Field of Classification Search ................. 380/263
See application file for complete search history.

(56) References Cited

U.S. PATENT DOCUMENTS

| | | |
|---|---|---|
| 6,331,974 B1 | 12/2001 | Yang et al. |
| 6,363,153 B1 | 3/2002 | Parker et al. |
| 6,661,831 B1 * | 12/2003 | Umeno .................. 375/142 |

OTHER PUBLICATIONS

Andrey Kisel, Heve Dedieu, Thomas Schimming; Maximum Likelihood Approaches for Noncoherent Communications with Chaotic Carriers; 2001; IEEE.*

Geza Kolumban et al., "Differential Chaos Shift Keying: A Robust Coding for Chaos Communication", published in the 1996 Proceedings of International Specialist Workshop on Nonlinear Dynamics of Electronics Systems, pp. 87-92, Jun. 27-28, 1996, Seville, Spain.

Geza Kolumban et al., "Multilevel Differential Chaos Shift Keying", published in the 1997, Proceedings of International Specialist Workshop on Nonlinear Dynamics of Electronics Systems, pp. 191-196.

Lau et al., "A Multiple-Access Technique for Differential Chaos-Shift Keying", published in Jan. 2002 in IEEE Transactions on Circuits and Systems I, Fundamental Theory and Applications, vol. 49, No. 1, pp. 96-104.

* cited by examiner

*Primary Examiner*—Michael J Simitoski
*Assistant Examiner*—James Turchen
(74) *Attorney, Agent, or Firm*—Buchanan Ingersoll & Rooney PC

(57) ABSTRACT

A digital communication system based on the use of chaotic carriers is disclosed. For each symbol to be sent, the transmitter sends a reference chaotic signal followed by a transformed version of the reference chaotic signal. For different symbols, different transformations are performed. Also, the transformations are designed such that the transformed versions of the reference chaotic signal do not resemble the original reference chaotic signal. As a consequence, little information can be deduced by inspecting the frequency spectrum of the transmitted signal. Moreover, even if the communication could be detected, it is difficult to decode the messages because there are numerous transformations possible.

29 Claims, 8 Drawing Sheets

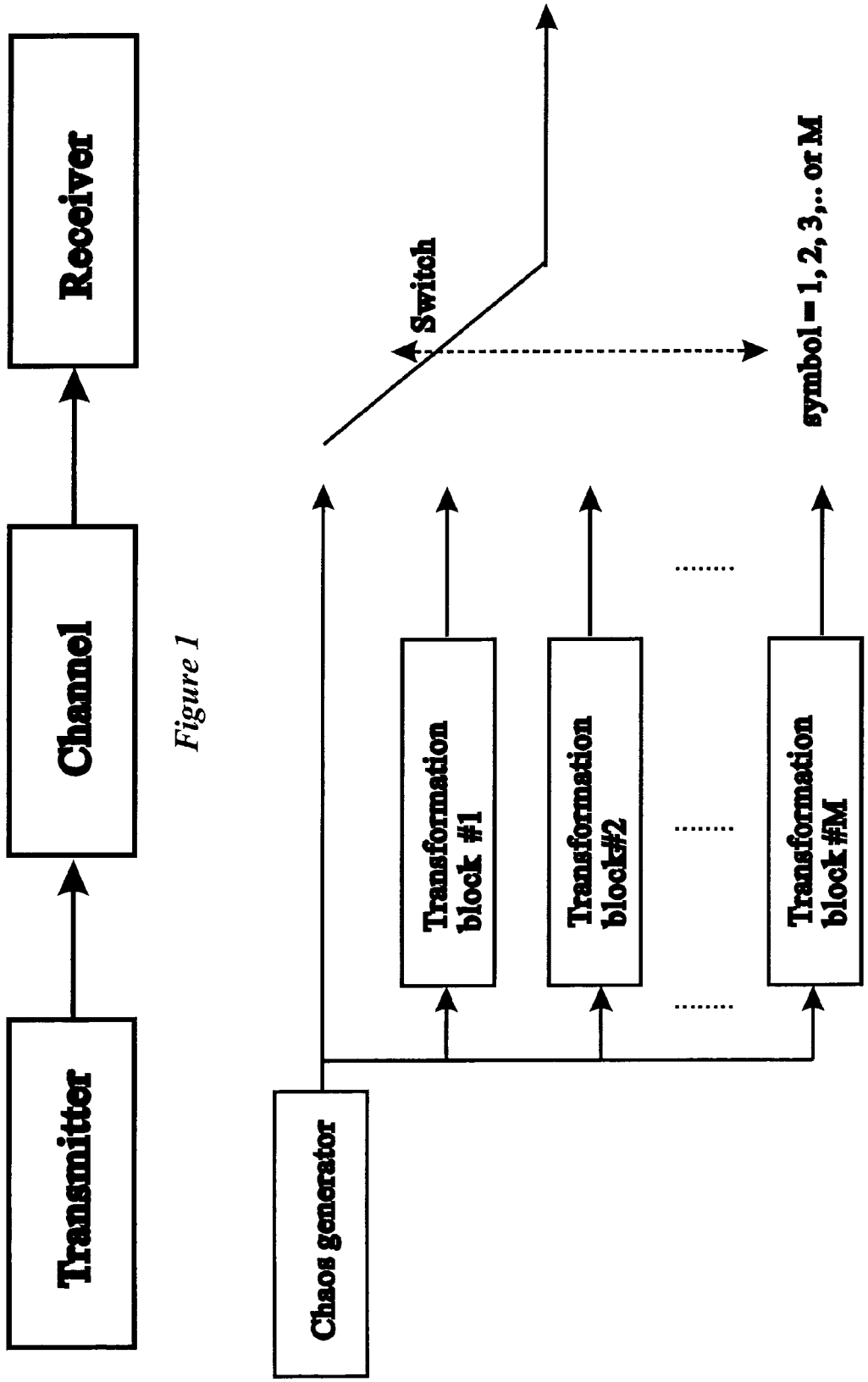

METHODS AND SYSTEMS FOR TRANSCEIVING CHAOTIC SIGNALS

FIELD OF THE INVENTION

This invention relates to data transmission methods and systems, particularly those transceiving digital data.

BACKGROUND OF THE INVENTION

Since the early 1990's, communication systems based on chaotic carriers have been proposed. Chaotic signals can be generated with very simple circuitry and are characterized by a wide bandwidth. By using a chaotic carrier to spread the digital signal over a wide frequency band, the resulting system inherits the benefits of spread-spectrum communications such as mitigation of multipath fading and low probability of detection.

Communication systems based on chaos can be broadly categorized into two groups. In the first group, chaotic signals carrying the information must be synchronously reproduced at the receiver in order to recover the information. Many synchronization techniques have been proposed and studied in the literature, for example, U.S. Pat. Nos. 6,363,153 and 6,331,974. Communication systems based on synchronized chaos have a high security because identical chaotic circuits are required at the transmitters and receivers. However, synchronization techniques are only stable under a very low noise environment. When the noise level is increased to a practical level, synchronization will fail and the communication systems no longer function properly.

In the second group of chaos-based communication systems, the chaotic carriers need not be regenerated at the receiving end. The receivers determine the transmitted information based only on the incoming chaotic signals. An example of such systems is the differential chaos-shift-keying (DCSK) scheme, which is described in the original paper by Kolumbán et al. in 1996, ("Differential chaos shift keying: A robust coding for chaos communications" published in the 1996 Proceedings of International Specialist Workshop on Nonlinear Dynamics of Electronics Systems, pp. 87-92). In this system, each bit duration is divided into two equal time slots. In the first time slot, a reference chaotic signal is sent. Dependent upon the binary symbol being sent, the reference signal is either repeated or multiplied by "−1" and transmitted in the second time slot. The chaotic signal in the second time slot is known as the information-bearing chaotic signal because it carries the binary symbol being sent. However, because of the regular bit structure and the high correlation between the reference chaotic signal and the information-bearing chaotic signal, the bit frequency can be easily determined from the transmitted signal, jeopardizing the security of this system.

In addition, chaotic signals, being wideband, occupy a bandwidth much larger than what is required to transmit the information. Hence, more than one user should be able to transmit information in the same frequency band. Multiple access techniques based on the differential chaos-shift-keying scheme, as described in the papers by Kolumbán et al. in 1997, ("Multilevel differential chaos shift keying" published in the 1997 Proceedings of International Specialist Workshop on Nonlinear Dynamics of Electronics Systems, pp. 191-196) and by Lau et al. in 2002, ("A multiple access technique for differential chaos shift keying" published in IEEE Transactions on Circuits and Systems I, pp. 96-104), make use of different transmitted bit/frame structures for different users to minimize the interference between users. However, the similarity between the reference chaotic signal and the information-bearing chaotic signal remains. Hence, anyone with a simple correlator-type receiver can decode the signals easily.

OBJECTS OF THE INVENTION

Therefore, it is an object of this invention to provide a chaos-based digital communication system that does not require the regeneration of chaotic carriers at the receiving end, and/or resolve at least one or more of the problems as set forth in the prior art. As a minimum, it is an object of this invention to provide the public with a useful choice.

SUMMARY OF THE INVENTION

Accordingly, this invention provides a method for transmitting and receiving a digital message having N digits in a system. Each of said N digits having any one of M values k. Each k corresponds with a $k^{th}$-second chaotic signal generator associating with a $k^{th}$-second chaotic algorithm, and is transmitted within a bit period as a chaotic signal comprising a first chaotic signal and a second chaotic signal the bit period being divided into a first portion and a second portion. The first chaotic signal is generated from a first chaotic signal generator by a first chaotic algorithm, and transmitting the first chaotic signal in the first portion of the bit period. Then the corresponding $k^{th}$-second chaotic signal generator is selected, and the first chaotic signal is fed to the $k^{th}$-second chaotic signal generator to generate the second chaotic signal, and transmitting the second chaotic signal in the second portion of the bit period. The first and second chaotic signals are received at a receiver storing a demodulating algorithm, and demodulating the chaotic signals to generate the transmitted value k. It should be noted that the first and second chaotic signals are sent at any order.

Optionally, the chaotic signal may be demodulated by the demodulating algorithm by the steps of:

separating the first and second chaotic signals received at the receiver;

transforming the second chaotic signal received at the receiver according to the inverse of the second chaotic algorithm for each of the second chaotic signal generators to generate a plurality of inversely transformed second chaotic signals;

matching the first chaotic signal with the plurality of inversely transformed second chaotic signals; and assigning the transmitted value according to the closest match between the first chaotic signal and the plurality of inversely transformed second chaotic signals.

Alternatively, the method as claimed in claim 1, wherein the chaotic signal is demodulated by the demodulating algorithm by the steps of:

separating the first and second chaotic signals received at the receiver;

transforming the first signal received at the receiver according to the second chaotic algorithm for each of the second chaotic signal generators to generate a plurality of transformed first chaotic signals;

a matching the second chaotic signal with the plurality of transformed first chaotic signals; and assigning the transmitted value according to the closest match between the second chaotic signal and the plurality of transformed first chaotic signals.

Preferably, the first chaotic signal includes a series of numbers sent within the first portion of the bit period. More preferably, the first chaotic signal is generated by the steps of:

a) inputting a random number to the first chaotic algorithm to generate a first chaotic number;
b) inputting the first chaotic number to the first chaotic algorithm to generate a second chaotic number; and
c) repeating step b) using the second chaotic number as the first chaotic number until all numbers to be transmitted within the first portion of the bit period are generated.

The first chaotic algorithm is preferred to be $y=4x^3-3x$, x is an input number, and y is one of the numbers forming the first chaotic signal.

Optionally, M equals to 2, and each digit has a value of either 0 or 1.

It is another aspect of this invention to provide a method for transmitting the value k in a system for transmitting a digital message having N digits, each of said N digits having any one of M values, and wherein each of said M values k
corresponds with a $k^{th}$-second chaotic signal generator associating with a k-second chaotic algorithm; and
is transmitted within a bit period as a chaotic signal comprising a first chaotic signal and a second chaotic signal, the bit period being divided into a first portion and a second portion
including the steps of:
generating the first chaotic signal from a first chaotic signal generator by a first chaotic algorithm, and transmitting the first chaotic signal in the first portion of the bit period;
selecting the corresponding $k^{th}$-second chaotic signal generator,
feeding the first chaotic signal to the $k^{th}$-second chaotic signal generator to generate a second chaotic signal, and transmitting the second chaotic signal in the second portion of the bit period, It is yet another aspect of this invention to provide a method for receiving the value k in a system for transmitting and receiving a digital message having N digits, each of said N digits having any one of M values, and wherein each of said M values k corresponds with a $k^{th}$-second chaotic signal generator having chaotic characteristic value associating with a k-second chaotic algorithm to generate a second chaotic signal, said chaotic signal being transmitted within a bit period as a chaotic signal comprising a first chaotic signal and a second chaotic signal, the bit period being divided into a first portion and a second portion, including the step of receiving the first and second chaotic signals at a receiver storing a demodulating algorithm, and demodulating the chaotic signals to generate the transmitted value k.

It is a further aspect of this invention to provide a system for transmitting and receiving a digital message having N digits, each of said N digits having any one of M values, and wherein each of said M values k is transmitted within a bit period, the bit period being divided into a first portion and a second portion, The system includes:
a transmitter having a first chaotic signal generator and M second chaotic signal generators, each of said M second chaotic signal generators corresponding to one of the M values k and associating with a $k^{th}$-second chaotic algorithm, such that
a chaotic signal representing the value k and comprising a first chaotic signal and a second chaotic signal is transmitted within a bit period, the bit period being divided into a first portion and a second portions;
said first chaotic signal being generated from the first chaotic signal generator by a first chaotic algorithm; and
said second chaotic signal being generated by a corresponding $k^{th}$-second chaotic signal generator using the first chaotic signal as an input; and
a receiver having a demodulator and storing the chaotic characteristic values of all of the chaotic signal generators, to receive and demodulate the chaotic signal to generate the transmitted value.

Preferably, the demodulator incorporates a demodulating algorithm to demodulate the chaotic signal by the steps of:
separating the first and second chaotic signals received at the receiver;
transforming the second chaotic signal received at the receiver according to the inverse of the second chaotic algorithm for each of the second chaotic signal generators to generate a plurality of inversely transformed second chaotic signals;
matching the first chaotic signal with the plurality of inversely transformed second chaotic signals; and
assigning the transmitted value according to the closest match between the first chaotic signal and the plurality of inversely transformed second chaotic signals.

Alternatively, the demodulator incorporates a demodulating algorithm to demodulate the chaotic signal by the steps of:
separating the first and second chaotic signals received at the receiver;
transforming the first signal received at the receiver according to the second chaotic algorithm for each of the second chaotic signal generators to generate a plurality of transformed first chaotic signals;
matching the second chaotic signal with the plurality of transformed first chaotic signals; and
assigning the transmitted value according to the closest match between the second chaotic signal and the plurality of transformed first chaotic signals.

This invention also provides a transmitter for use in a system for transmitting and receiving a digital message having N digits, each of said N digits having any one of M values, and wherein each of said M values k is transmitted within a bit period, said transmitter having a first chaotic signal generator and M second chaotic signal generators, each of said M second chaotic signal generators corresponding to one of the M values k and associating with a $k^{th}$-second chaotic algorithm, such that
a chaotic signal representing the value k and comprising a first chaotic signal and a second chaotic signal is transmitted within a bit period, the bit period being divided into a first portion and a second portions;
said first chaotic signal being generated from the first chaotic signal generator by a first chaotic algorithm; and
said second chaotic signal being generated by a corresponding $k^{th}$-second chaotic signal generator using the first chaotic signal as an input.

It is a further aspect of this invention to provide a receiver for use in a system for transmitting and receiving a digital message having N digits, each of said N digits having any one of M values, and wherein each of said M values k corresponds with a $k^{th}$-second chaotic signal generator associating with a $k^{th}$-second chaotic algorithm to generate a second chaotic signal, said chaotic signal being transmitted within a bit period comprising a first chaotic signal and a second chaotic signal, said chaotic signal being generated by the steps of:
generating a first chaotic signal from a first chaotic signal generator by a first chaotic algorithm, and transmitting the first chaotic signal in the first portion of the bit period;
selecting the corresponding $k^{th}$-second chaotic signal generator;

feeding the first chaotic signal to the $k^{th}$-second chaotic signal generator to generate a second chaotic signal, and transmitting the second chaotic signal in the second portion of the bit period wherein said receiver has a demodulator and stores the chaotic characteristic values of all of the chaotic signal generators, to receive and demodulate the chaotic signal to generate the transmitted value.

BRIEF DESCRIPTION OF THE DRAWINGS

Preferred embodiments of the present invention will now be explained by way of example and with reference to the accompanying drawings in which:

FIG. 1 shows a block diagram of a communication system of this invention;

FIG. 2 shows an exemplary transmitter of this invention;

DETAILED DESCRIPTION OF THE PREFERRED EMBODIMENT

Figure 3:
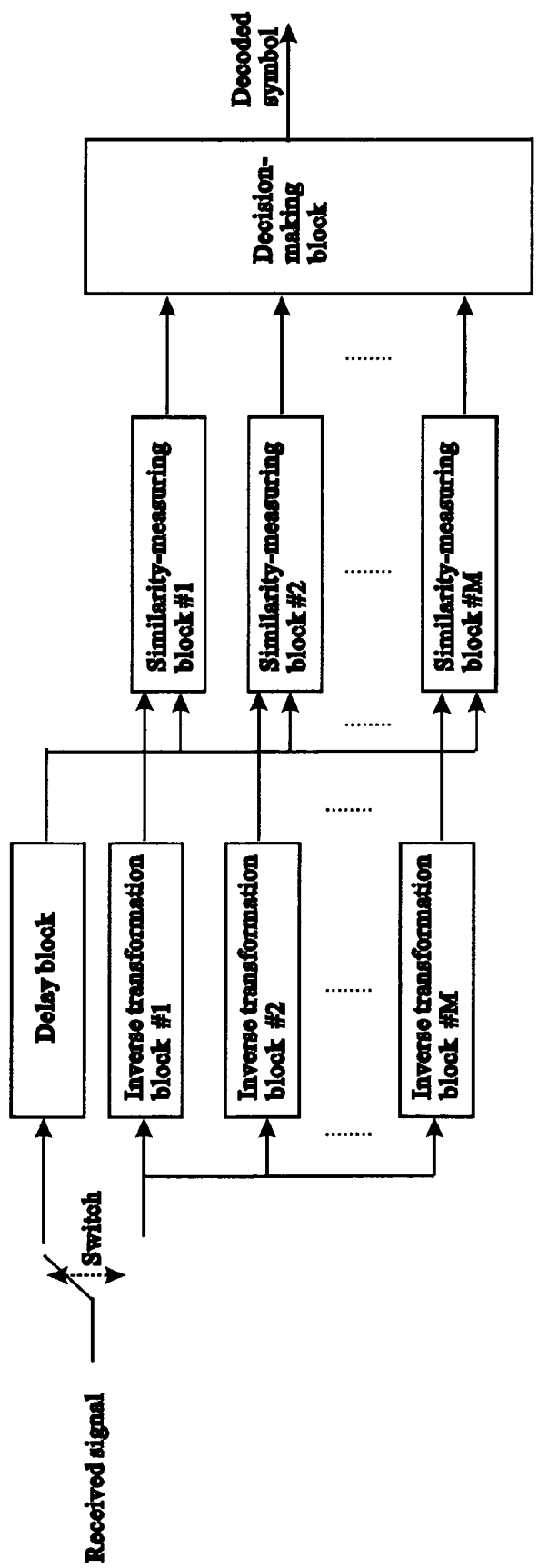
FIG. 3 shows the structure of a receiver of this invention.

This invention is now described by way of example with reference to the figures in the following paragraphs. List 1 is a part list so that the reference numerals in the figures may be easily referred to.

Objects, features, and aspects of the present invention are disclosed in or are obvious from the following description. It is to be understood by one of ordinary skill in the art that the present discussion is a description of exemplary embodiments only, and is not intended as limiting the broader aspects of the present invention, which broader aspects are embodied in the exemplary constructions.

FIG. 1 shows a digital communication system, consisting of a transmitter, a channel and a receiver. The transmitter, as depicted in FIG. 2, contains a chaos generator or the first chaotic signal generator, M transformation blocks and a switch. M is an integer larger than 1. For example, M equals 2 in a binary digital communication system.

The signal transmitted for a particular symbol or value k, which assumes any of the values 1, 2, 3, ..., M, is described as follows. During the first portion or first half of the symbol period or the bit period, the output of the transmitter is connected to the output of the chaos generator or the first chaotic signal generator by the switch, and the signal from the chaos generator, which may be called as the first chaotic signal, is transmitted. At the same time, the signal from the chaos generator is also fed into M separate transformation blocks or second chaotic signal generator, namely transformation block #1, transformation block #2, transformation block #3, etc. Each of the transformation blocks takes the input signal, in this case the first chaotic signal, and converts it to another output signal or the second chaotic signal. In the second portion of the symbol or bit period, the output of the transmitter is connected to the output of one of the transformation blocks or the second chaotic signal generator through the switch and the second chaotic signal is sent by the transmitter. The selection of the transformation block depends on the value of the symbol k to be sent. If the symbol value is a "1", the output of the transformation block #1 will be connected to the transmitter output. If the symbol value is a "2", the output of the transformation block #2 will be connected to the transmitter output, and so on.

It should be noted that the first chaotic signal is fed to all of the M second chaotic signal generators, and the selection step occur after M second chaotic signals are generated. It is also possible to arrange the switch to be situated between the first chaotic signal generator or the chaos generator in FIG. 1 to perform the above selection process before the second chaotic signals is generated. In such a case, only one second chaotic signal correspond to the transmitted value k is generated. The disadvantage is one more switch will be required to select the output from the chaos generator and the transformation blocks, though less processing power will be required.

Further, there is no restriction on the size of the first and second portions of the bit period, although the first and second portions are prepared to have equal time. A second portion having longer or shorter time than the first portion may affect the security and the bit error performance of the system.

It should also be noted that although the two portions of the bit period are termed the first and second portions, there is no restriction to the order of which portion and the corresponding chaotic signal is to be sent out of the transmitter first, although the first chaotic signal has to be generated first as such is used as the input for generating the second chaotic signal. The above example describes that the first chaotic signal in the first portion is sent before the second chaotic signal in the second portion. This invention can also work if the second chaotic signal is sent before the first chaotic signal. In such a case, the first chaotic signal may be delayed by a delay block.

In practice, the transmitted signal, comprising the output from the chaos generator and the output from one of the transformation blocks, will be contaminated by channel noise when arriving at the receiver. Based on the received signal within each symbol duration, the receiver will determine which of the M symbols has been sent. Two receiver designs are disclosed here. The first receiver design, shown in FIG. 3, consists of a switch, a delay block, M inverse transformation blocks, M similarity-measuring blocks and a decision-making block. The signal in the first half of each symbol duration goes into the delay block through the switch. For the second half of the symbol duration, the signal received is passed, through the switch, to M separate inverse transformation blocks. The inverse transformation blocks are designed in such a way that when a certain signal is passed into a transformation/inverse transformation pair at the transmitter and receiver, the same signal will be recovered. Also, if a certain signal is passed into a transformation block and an inverse transformation block which do not form a pair, a different signal will be recovered A similarity measure is then performed comparing the output from each of the inverse transformation blocks and the received signal in the first half of the symbol duration. The inverse transformation block corresponding to the largest similarity measure is then selected and the corresponding symbol is decoded.

Figure 4:
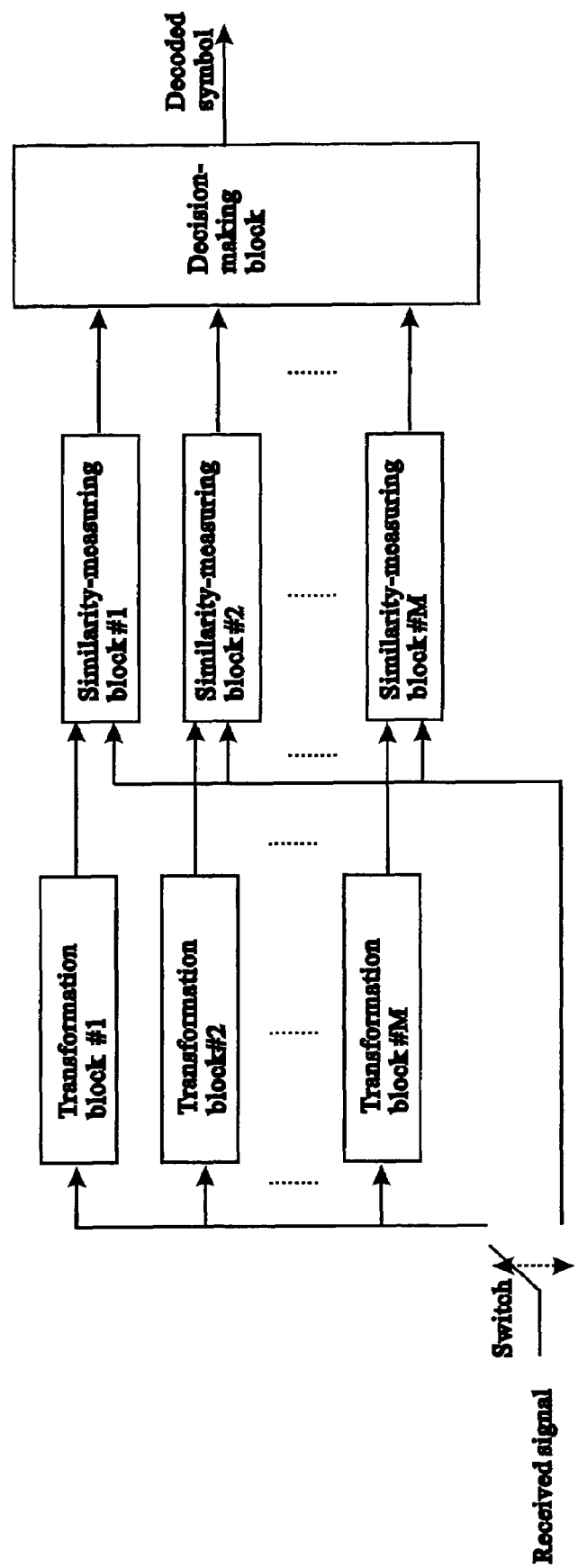
FIG. 4 shows the structure of an alternative design of the receiver.

The second receiver design, as shown in FIG. 4, consists of a switch, M transformation blocks, M similarity-measuring blocks and a decision-making block. The signal in the first half of each symbol duration goes through the switch to M separate transformation blocks, which are identical to those used in the transmitter. In the second half of the symbol duration, the received signal is sent to the M similarity-measuring blocks via the switch. A similarity measure is then performed comparing the output from each of the transformation blocks and the received signal in the second half of the symbol duration. The transformation block corresponding to the largest similarity measure is then selected and the corresponding symbol is decoded.

EXAMPLES

A first particular implementation is described in the following. A binary system is implemented. In the chaos generator in the transmitter, rectangular pulses of varying amplitudes are being produced. The amplitude of each pulse is determined based on an iterative process whose working principle is as follows. The iterative map acts on a random input number x and generates a number which is equal to $4x^3-3x$. The resulting number is then treated as an input number, and is acted upon by the iterative map to generate another number again. As the iterative process repeats, a sequence of numbers is generated, which is random-like and the numbers are used as the amplitudes of the rectangular pulses. Also, the chaos generator produces 2N rectangular pulses within one bit duration, where N is an integer not less than 1 and 2N is commonly known as the spreading factor. During the first half of each bit duration, the N rectangular pulses produced are sent. At the same time, these pulses are fed into the first and second transformation blocks. In the transformation blocks, the input pulses are grouped into K consecutive time slots of equal duration, where N is an integer multiple of K. The first transformation block re-arranges the sequence of these time slots in such a way that no time slot remains in its original location. The location where the signal in each time slot should move to is determined by the entries in a permutation matrix. In a permutation matrix, all diagonal elements are zero. Also, the elements are either "0" or "1" and there is exactly one "1" in each row and in each column. (The discussion on permutation matrix can be found in the book "Matrix Algorithms" by Stewart G. W. , Philadelphia: Society for Industrial and Applied Mathematics, 1998.) A typical permutation matrix, with K equal to 5, is shown in the following.

$$R_{5\times 5} = \begin{bmatrix} 0 & 0 & 1 & 0 & 0 \\ 0 & 0 & 0 & 0 & 1 \\ 0 & 1 & 0 & 0 & 0 \\ 1 & 0 & 0 & 0 & 0 \\ 0 & 0 & 0 & 1 & 0 \end{bmatrix} \quad (1)$$

Figure 5:
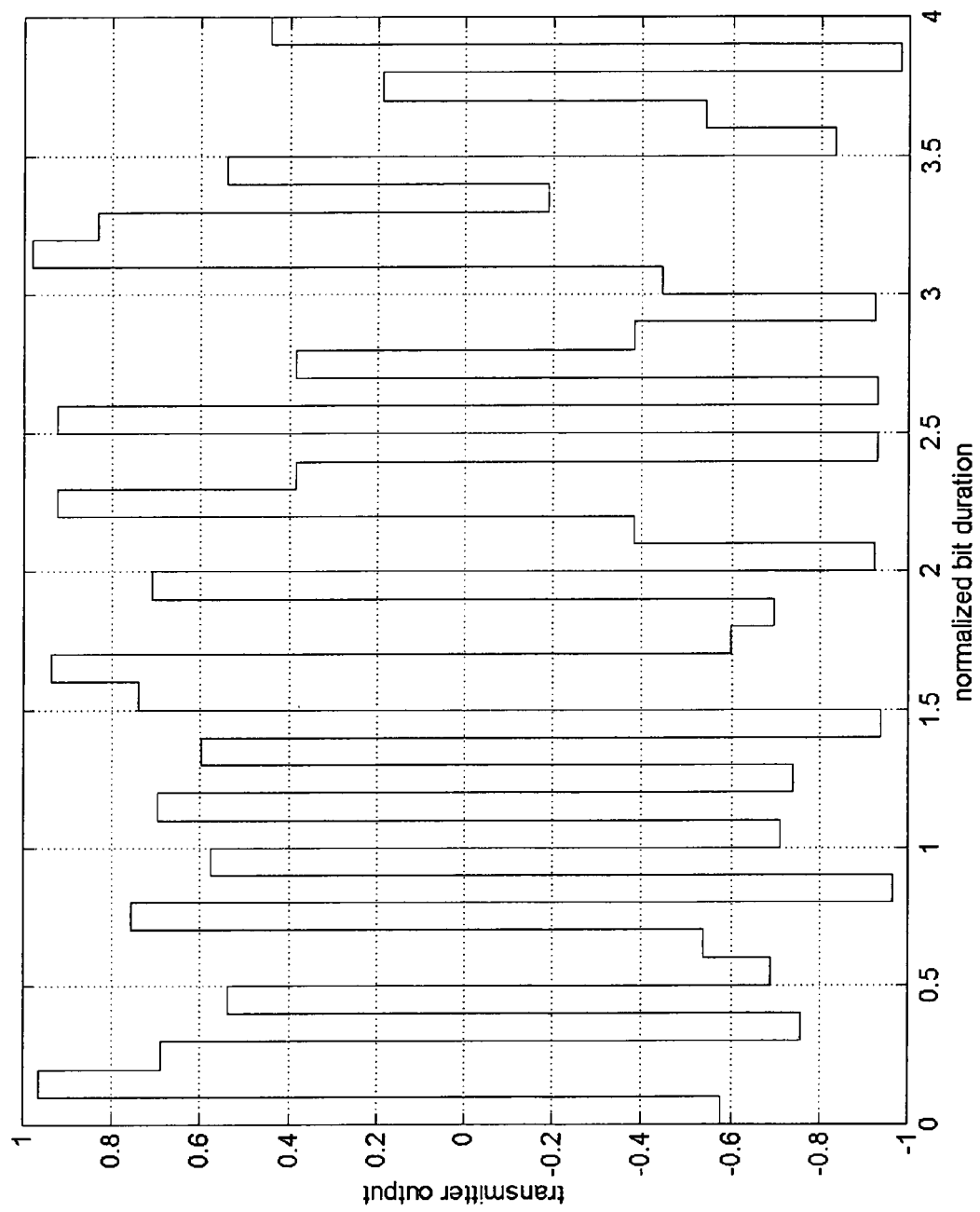
FIG. 5 shows an example of the transmitted signal.
Figure 6:
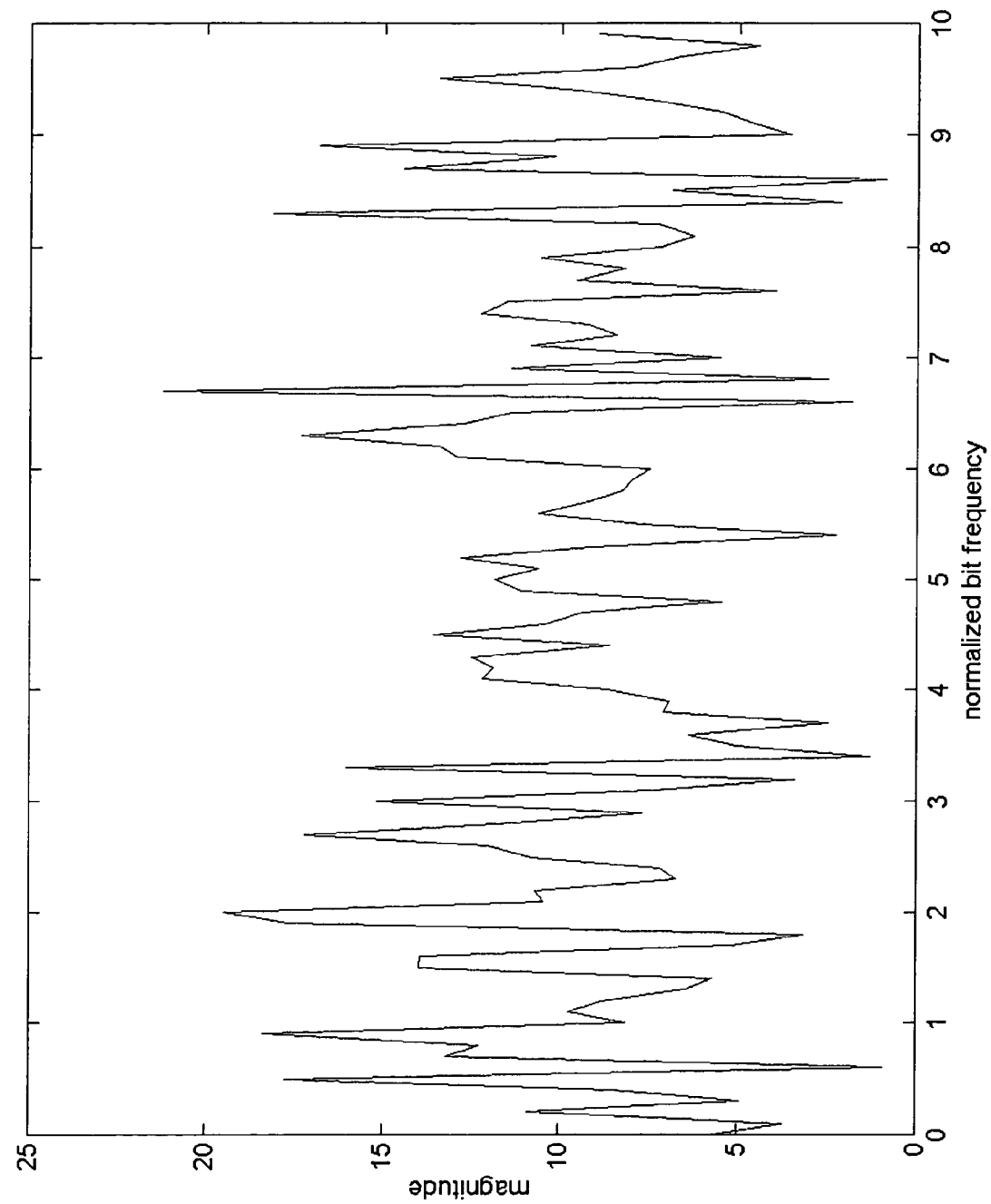
FIG. 6 shows the magnitude spectrum of the transmitted signal of FIG. 5.
Figure 7:
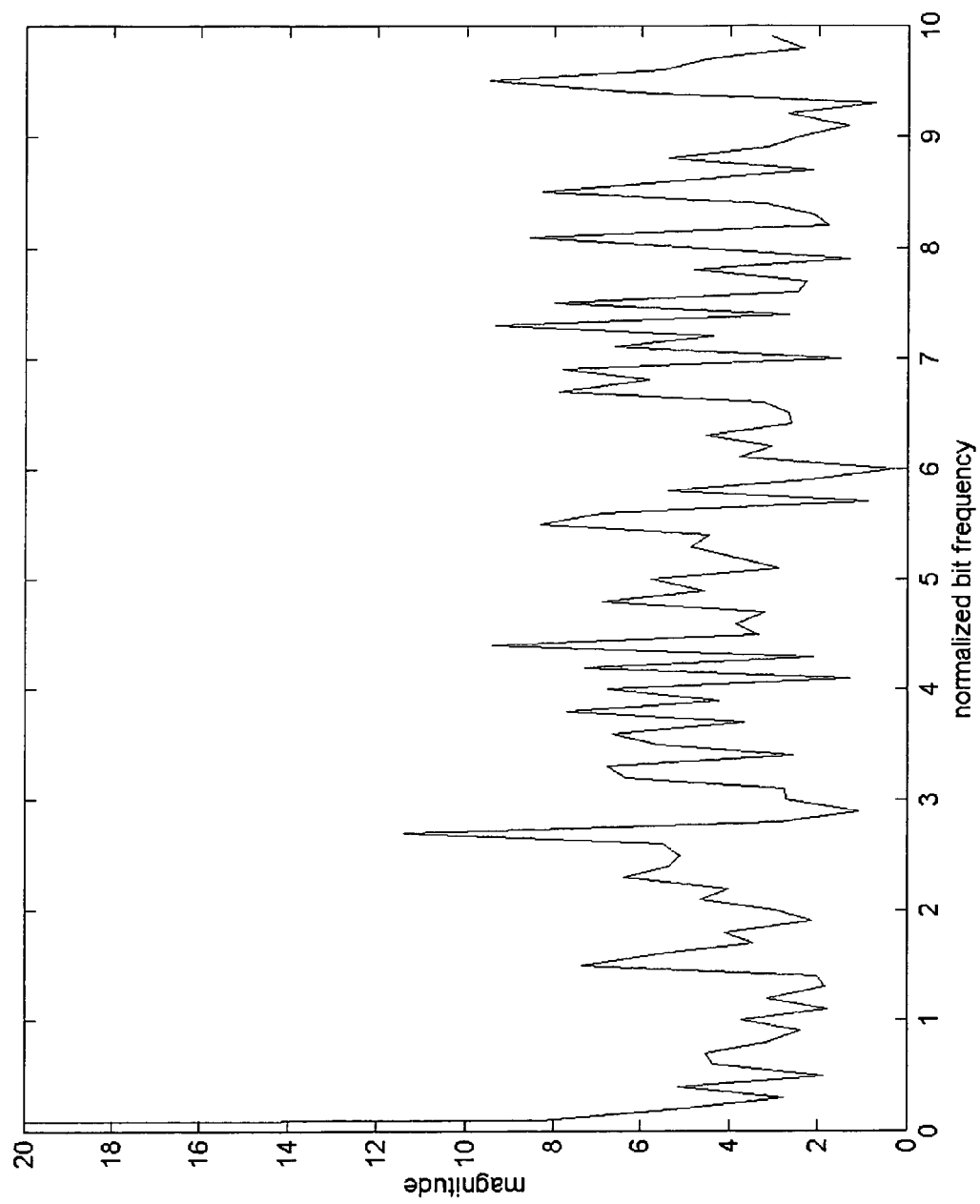
FIG. 7 shows the magnitude spectrum of the square of the transmitted signal of FIG. 5.
Figure 8:
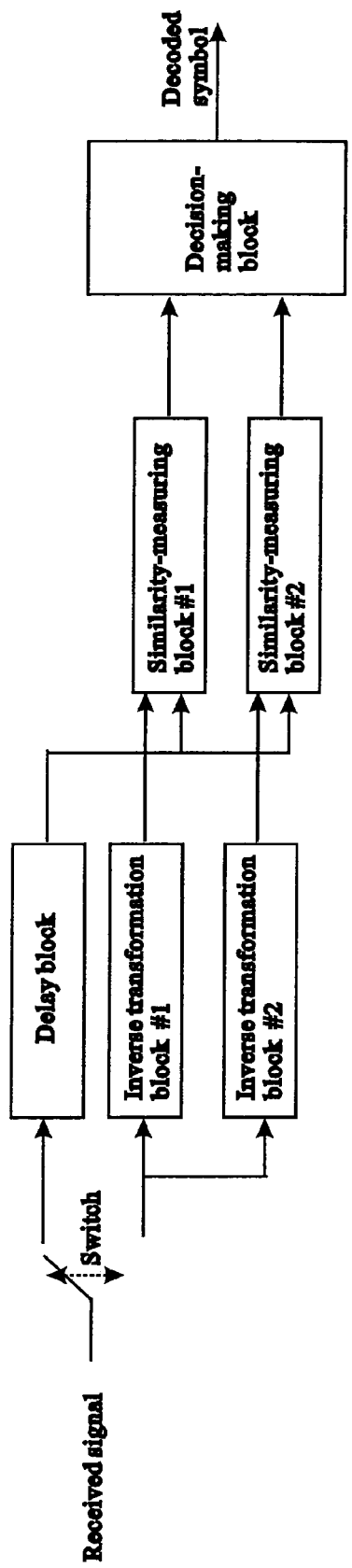
FIG. 8 shows the design of a receiver for a binary digital communication system of this invention.

Based on the permutation matrix, the re-arrangement of the time slots can be proceeded as follows. Denote the element in the k th row and the j th column of the permutation matrix by ekj. If ekj is the non-zero element in the k th row (for k=1, 2, ..., N), then the signal in the k th time slot in the original sequence will be inserted into the j th time slot after the re-arrangement. Using the permutation matrix shown in Eq(1) as an example, since the non-zero element in the first row lies in column 3, the signal in the first time slot should be moved to the third time slot in the transformation process. Similarly, the signal in the second time slot should be moved to the fifth time slot, and so on. The second transformation block also re-arranges the signals in the time slots as the first transformation block does. In addition, the second transformation block inverts the sign of the amplitude of each of the chaotic pulses. That is to say, if an original rectangular pulse has an amplitude of +0.3, it will be shifted to another location with its amplitude changed to −0.3 during the transformation. If the transmitted symbol is a "1", the output of the first transformation block will be sent in the second half of the bit duration. However, if the transmitted symbol is a "2", the output of the second transformation block will be sent in the second half of the bit duration. FIG. 5 shows a sample of the transmitted signal where 10 rectangular pulses are sent in each bit duration. Also, only one rectangular pulse exists within each time slot in the second half of the bit duration. FIGS. 6 and 7 plot the magnitude spectra of the transmitted signal and the square of the transmitted signal, respectively. It can be seen that no information on the bit rate can be retrieved from the spectra. When the transmitted signal, corrupted by additive noise in the channel, arrives at the receiver, the signal in the first half of each bit duration is passed to a delay block, whereas the signal in the second half of each bit duration will undergo two separate inverse transformations, as depicted in FIG. 8. In the first inverse transformation block, each of the signals in the time slots in the second half of the bit duration will be re-shuffled back to its original location. The re-shuffling procedure is described as follows. First, the inverse of the permutation matrix used in re-arranging the time slots in the transmitter is computed. For example, the inverse of the permutation matrix in Eq(1) is given by $$B_{5\times 5} = R_{5\times 5}^{-1} = \begin{bmatrix} 0 & 0 & 0 & 1 & 0 \\ 0 & 0 & 1 & 0 & 0 \\ 1 & 0 & 0 & 0 & 0 \\ 0 & 0 & 0 & 0 & 1 \\ 0 & 1 & 0 & 0 & 0 \end{bmatrix}. \quad (2)$$

Note that a matrix, when pre-multiplied or post-multiplied by its inverse, always produces an identity matrix (a matrix with 1's on the diagonal and 0's elsewhere) of the same size. In the example given in Eq(1) and Eq(2), $$B_{5\times 5}R_{5\times 5} = R_{5\times 5}B_{5\times 5} = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix}. \quad (3)$$

Figure 9:
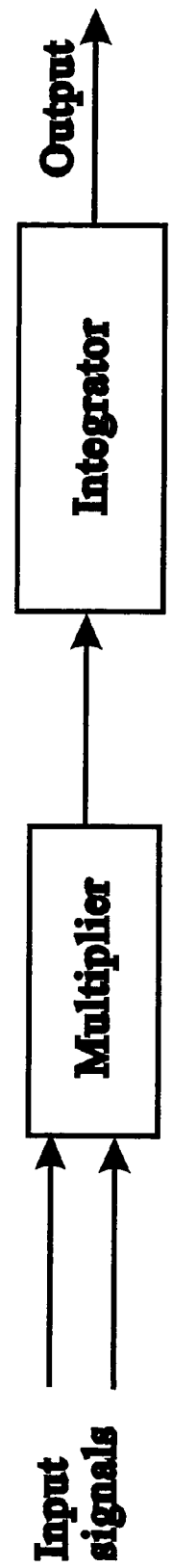
FIG. 9 shows a correlator for measuring similarity between two signals.

Based on the inverse of the permutation matrix, the signals in the time slots are re-shuffled based on the same principle used in the transmitter. For example, in the matrix in Eq(2), the non-zero element in the first row lies in the $4^{th}$ column. Thus, the signal in the first time slot will be moved to the fourth time slot during the inverse transformation process. For the second inverse transformation block, the signals in the time slots will be inter-changed the same way as in the first inverse transformation, but the sign of the signals in the time slots will also be inverted. The output signals from these two inverse transformation blocks are now compared with the signal received in the first half of the bit duration. The level of similarity or likeness is measured by a correlator, which is formed by a multiplier followed by an integrator, as depicted in FIG. 9. The multiplier produces the product of the two input signals, whereas the integrator accumulates the output of the multiplier. During the half symbol duration when the signal received in the first half of the bit duration is compared with the output of the inverse transformation block, the integrator operates. At the end of the half symbol duration, the integrator passes its output to the decision-making circuit, resets itself and waits until the time instance for the next comparison to begin. The decision-making circuit compares the two correlator outputs. The bit corresponding to the larger correlator output will be decoded. Computer simulations have been performed to evaluate the performance of the binary chaos-based digital communication system. As is customary in evaluating all digital communication systems, the bit error rates (BERs) are evaluated for different bit-energy-to-noise-power-spectral-density ratios, denoted by Eb/No. In the simulations, 200 rectangular pulses have been sent in each bit duration (i.e., 2N=200), and for the transmitted signal, there is only one rectangular pulse in each time slot in the second half of the bit duration. The BERs are tabulated below.

| Eb/No values | BER |
|---|---|
| 12 dB | 0.1 |
| 14 dB | 0.02 |
| 16 dB | 0.001 |
| 18 dB | 0.00001 |

Figure 10:
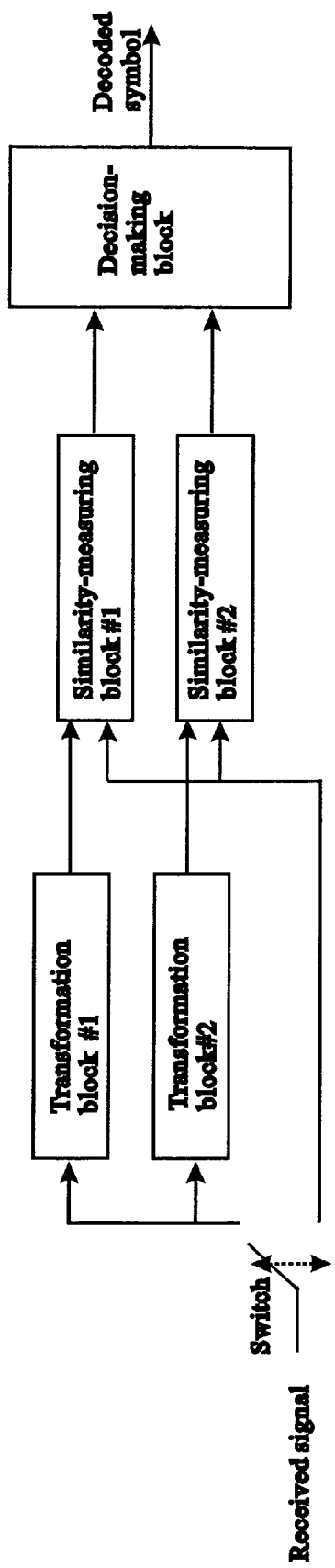
FIG. 10 shows an alternative receiver design of a binary digital communication system of this invention.

A second particular implementation is described in the following. A binary system is implemented. In the chaos generator in the transmitter, rectangular pulses of varying amplitudes are being produced. The amplitude of each pulse is determined based on an iterative process whose working principle is as follows. The iterative map acts on an input number x and generates a number which is equal to $4x^3-3x$. The resulting number is then treated as an input number, and is acted upon by the iterative map to generate another number again. As the iterative process repeats, a sequence of numbers is generated, which is random-like and the numbers are used as the amplitudes of the rectangular pulses. Also, the chaos generator produces 2N (N is an integer not less than 1 and 2N is also known as the spreading factor) rectangular pulses within one bit duration. During the first half of each bit duration, the N rectangular pulses produced are sent. At the same time, these pulses are fed into the first and second transformation blocks. In the transformation blocks, the input pulses are grouped into K consecutive time slots of equal duration, where N is an integer multiple of K. The first transformation block re-arranges the sequence of these time slots in such a way that no time slot remains in its original location. The location where the signal in each time slot should move to is determined by the entries in a permutation matrix. Denote the element in the k th row and the j th column of the permutation matrix by ekj. If ekj is the non-zero element in the k th row (for k=1, 2, ..., N), then the signal in the k th time slot in the original sequence will be inserted into the j th time slot after the re-arrangement. The second transformation block also re-arranges the signals in the time slots in the same way as the first transformation block does. In addition, the second transformation block inverts the sign of the amplitude of each of the chaotic pulses. If the transmitted symbol is a "1", the output of the first transformation block will be sent in the second half of the bit duration. However, if the transmitted symbol is a "2", the output of the second transformation block will be sent in the second half of the bit duration. When the transmitted signal corrupted by additive noise in the channel, arrives at the receiver, the signal in the first half of each bit duration will undergo two separate transformations identical to those used in the transmitter, as depicted in FIG. 10. The output signals from these two transformation blocks are now compared with the signal received in the second half of the bit duration. The similarity measure is accomplished by a correlator, which is formed by a multiplier followed by an integrator. Then, the two integrator outputs will be passed on to a decision-making circuit. The symbol corresponding to the larger correlator output will be taken as the decoded symbol. Computer simulations have been performed to evaluate the performance of the binary chaos-based digital communication system. As is customary in evaluating digital communication systems, the bit error rates (BERs) are evaluated for different bit-energy-to-noise-power-spectral-density ratios, denoted by Eb/No. In the simulations, 200 rectangular pulses have been sent in each bit duration (i.e., 2N=200), and for the transmitted signal, there is only one rectangular pulse in each time slot in the second half of the bit duration. The BERs are tabulated below.

| Eb/No values | BER |
|---|---|
| 12 dB | 0.1 |
| 14 dB | 0.02 |
| 16 dB | 0.001 |
| 18 dB | 0.00001 |

A third particular implementation is described in the following. An M-ary chaos-based digital communication system is implemented. For the chaos generator in the transmitter, rectangular pulses of varying amplitudes are being produced. The amplitude of each pulse is determined based on an iterative process whose working principle is as follows. The iterative map acts on an input number x and generates a number which is equal to $1-2x^2$. The resulting number is then treated as an input number, and is acted upon by the iterative map to generate another number again. As the iterative process repeats, a sequence of numbers is generated, which is random-like and the numbers are used as the amplitudes of the rectangular pulses. Also, the chaos generator produces 2N rectangular pulses within one symbol duration, where N is an integer not less than 1 and 2N is commonly known as the spreading factor. During the first half of each symbol duration, the N rectangular pulses produced are sent. At the same time, these pulses are fed into the M transformation blocks. In the transformation blocks, the input pulses are grouped into K consecutive time slots of equal duration, where N is an integral multiple of K. All the transformation blocks are different and each of the transformation blocks re-arranges the time slots in such a way that no time slot remains in its original location. The corresponding permutation matrix for each transformation block is constructed in the following way. A random permutation matrix, comprising K columns and K rows, is first constructed. Let this matrix be denoted by RK×K. The permutation matrices in Eq(1) and Eq(2) are examples of a random permutation matrix with size 5×5. Define the "shifting" matrix, comprising K columns and K rows, as $$S_{K \times K} = \begin{bmatrix} 0 & 1 & 0 & \cdots & 0 \\ 0 & 0 & \ddots & \ddots & \vdots \\ \vdots & \ddots & 0 & \ddots & 0 \\ 0 & \ddots & \ddots & 0 & 1 \\ 1 & 0 & \cdots & 0 & 0 \end{bmatrix}. \quad (4)$$

For the i th transformation block, the corresponding permutation matrix is constructed by post-multiplying the "shifting" matrix i times to the random permutation matrix. Thus, the permutation matrix of the i th transformation block, denoted by $P^{(i)}$, is given by $P^{(i)}=P_{K \times K}S^i_{K \times K}$. In each of the transformation blocks, the signals in the time slots in the second half bit duration are shuffled as follows. In the corresponding permutation matrix of the transformation block, if $e_{kj}$ is the non-zero element in the k th (k=1, 2, ..., N) row, then the signal in the k th time slot will be inserted into the j th time slot after the re-arrangement. Finally, if the transmitted symbol is a "1", the output of the first transformation block will be sent in the second half of the symbol duration. However, if the transmitted symbol is a "2", the output of the second transformation block will be sent in the second half of the symbol duration, and so on. When the transmitted signal, corrupted by additive noise in the channel, arrives at the receiver, the signal in the first half of each bit duration is passed on to a delay block whereas the signal in the second half of each bit duration will undergo M separate inverse transformations, as depicted in FIG. 3. In each of the inverse transformation blocks, the time slots in the second half of the symbol duration will be shuffled again based on the inverse of the corresponding permutation matrix. The output signals from the M inverse transformation blocks are now compared with the signal received in the first half of the bit duration. The level of similarity is measured by a correlator, which is formed by a multiplier followed by an integrator. The M correlator outputs will be passed to a decision-making circuit. The symbol corresponding to the largest correlator output will be taken as the decoded symbol. Computer simulations have been performed to evaluate the performance of the M-ary chaos-based digital communication system. Different values of the spreading factor 2N and M have been simulated. As is customary in evaluating digital communication systems, the bit error rates (BERs) are evaluated for different bit-energy-to-noise-power-spectral-density ratios, denoted by Eb/No. The symbol energy Es and the bit energy Eb is related by Es=Eb/log2 M. Also, for the transmitted signal, there is only one rectangular pulse in each time slot in the second half of the bit duration. The BERs are tabulated below.

| 2N | M | Eb/No values in dB | BER |
|---|---|---|---|
| 40 | 2 | 4 | 0.39 |
| 40 | 2 | 6 | 0.31 |
| 40 | 2 | 8 | 0.24 |
| 40 | 2 | 10 | 0.14 |
| 40 | 2 | 12 | 0.07 |
| 200 | 32 | 4 | 0.40 |
| 200 | 32 | 6 | 0.33 |
| 200 | 32 | 8 | 0.19 |
| 200 | 32 | 10 | 0.051 |
| 200 | 32 | 12 | 0.0035 |
| 280 | 128 | 4 | 0.45 |
| 280 | 128 | 6 | 0.35 |
| 280 | 128 | 8 | 0.20 |
| 280 | 128 | 10 | 0.04 |
| 280 | 128 | 12 | 0.0009 |

A fourth particular implementation is described in the following. An M-ary chaos-based digital communication system is implemented. For the chaos generator in the transmitter, rectangular pulses of varying amplitudes are being produced. The amplitude of each pulse is determined based on an iterative process whose working principle is as follows. The iterative map on an input number x and generates a number which is equal to $1-2x^2$. The resulting number is then treated as an input number, and is acted upon by the iterative map to generate another number. As the iterative process repeats, a sequence of numbers is generated, which random-like and the numbers are used as the amplitudes of the rectangular pulses. Also, the chaos generator produces 2N rectangular pulses within one symbol duration, where N is an integer not less than 1 and 2N is commonly known as the spreading factor. During the first half of each symbol duration, the N rectangular pulses produced are sent. At the same time, these pulses are fed into the M transformation blocks. In the transformation blocks, the input pulses are grouped into K consecutive time slots of equal duration, where K divides N. All the transformation blocks are different and each of the transformation blocks re-arranges the time slots in such a way that no time slot remains in its original location. The corresponding permutation matrix for each transformation block is constructed in the following way. A random permutation matrix, comprising K columns and K rows, is first built and denote it by $R_{K \times K}$. Using the "shifting" matrix defined in Eq(4), for the i th transformation block, the corresponding permutation matrix is constructed by post-multiplying the "shifting" matrix i times to the random permutation matrix. Thus, the permutation matrix of the i th transformation block, denoted by $P^{(i)}$, is given by $P^{(i)}=P_{K \times K}S^i_{K \times K}$. In each of the transformation blocks, the time slots in the second half bit duration are inter-changed as described in the following. In the corresponding permutation matrix of the transformation block, if $e_{kj}$ is the non-zero element in the k th (k=1, 2, ..., N) row, then the k th time slot in the signal will become the j th time slot after the re-arrangement. Finally, if the transmitted symbol is a "1", the output of the first transformation block will be sent in the second half of the symbol duration. However, if the transmitted symbol is a "2", the output of the second transformation block will be sent in the second half of the symbol duration, and so on. When the transmitted signal, corrupted by additive noise in the channel, arrives at the receiver, the signal in the first half of each bit duration will undergo M separate transformations identical to those used in the transmitter, as depicted in FIG. 4. The output signals from these M transformation blocks are now compared with the signal received in the second half of the bit duration. The level of similarity is measured by a correlator, which is formed by a multiplier followed by an integrator. Then, the M correlator outputs will be passed on to a decision-making circuit. The symbol corresponding to the largest correlator output will be taken as the decoded symbol. Computer simulations have been performed to evaluate the performance of the M-ary chaos-based digital communication system. Different values of the spreading factor 2N and M have been simulated. As is customary in evaluating digital communication systems, the bit error rates (BERs) are evaluated for different bit-energy-to-noise-power-spectral-density ratios, denoted by Eb/No. The symbol energy Es and the bit energy Eb is related by Es=Eb/log2 M. Also, for the transmitted signal, there is only one rectangular pulse in each time slot in the second half of the bit duration. The BERs are tabulated below.

| 2N | M | Eb/No values in dB | BER |
|---|---|---|---|
| 40 | 2 | 4 | 0.39 |
| 40 | 2 | 6 | 0.31 |
| 40 | 2 | 8 | 0.24 |
| 40 | 2 | 10 | 0.14 |
| 40 | 2 | 12 | 0.07 |
| 200 | 32 | 4 | 0.40 |
| 200 | 32 | 6 | 0.33 |
| 200 | 32 | 8 | 0.19 |
| 200 | 32 | 10 | 0.051 |

-continued

| 2N | M | Eb/No values in dB | BER |
|---|---|---|---|
| 200 | 32 | 12 | 0.0035 |
| 280 | 128 | 4 | 0.45 |
| 280 | 128 | 6 | 0.35 |
| 280 | 128 | 8 | 0.20 |
| 280 | 128 | 10 | 0.04 |
| 280 | 128 | 12 | 0.0009 |

The above example may have illustrated that the chaotic transceiving method of this invention does not required the regeneration of the chaotic carrier at the receiver, nor storing any data of the chaotic carrier at the receiver end. Hence, the overall security may be improved.

While the preferred embodiment of the present invention has been described in detail by the examples, it is apparent that modifications and adaptations of the present invention will occur to those skilled in the art. Furthermore, the embodiments of the present invention shall not be interpreted to be restricted by the examples or figures only. It is to be expressly understood, however, that such modifications and adaptations are within the scope of the present invention, as set forth in the following claims. For instance, features illustrated or described as part of one embodiment can be used on another embodiment to yield a still further embodiment. Thus, it is intended that the present invention cover such modifications and variations within the scope of the claims and their equivalents.

The invention claimed is:

1. A method for transmitting and receiving a digital message having N digits, each of said N digits having any one of M values, in a system wherein each of said M values k corresponds with a kth-second chaotic signal generator associating with a kth-second chaotic algorithm, and is transmitted within a bit period as a chaotic signal comprising a first chaotic signal and a second chaotic signal, the bit period being divided into a first portion and a second portion, the method including the steps of:
   (i) generating the first chaotic signal from a first chaotic signal generator by a first chaotic algorithm, and transmitting the first chaotic signal in the first portion of the bit period;
   (ii) selecting the corresponding kth-second chaotic signal generator;
   (iii) feeding the first chaotic signal to the kth-second chaotic signal generator to generate the second chaotic signal, and transmitting the second chaotic signal in the second portion of the bit period; and
   (iv) receiving the first and second chaotic signals at a receiver, the receiver being adapted to execute a demodulating algorithm for demodulating the received first and second chaotic signals including the step of separating, via a switch, the received first and second chaotic signals which have been transmitted within each single bit period, and processing the separated first and second chaotic signals to generate the transmitted value k.

2. The method as claimed in claim 1, wherein the chaotic signal is demodulated by the demodulating algorithm by the steps of:
   separating the first and second chaotic signals received at the receiver;
   transforming the second chaotic signal received at the receiver according to the inverse of the second chaotic algorithm for each kth-second chaotic signal generator to generate a plurality of inversely transformed second chaotic signals;
   matching the first chaotic signal with the plurality of inversely transformed second chaotic signals; and
   assigning the transmitted value according to the closest match between the first chaotic signal and the plurality of inversely transformed second chaotic signals.

3. The method as claimed in claim 1, wherein the chaotic signal is demodulated by the demodulating algorithm by the steps of:
   separating the first and second chaotic signals received at the receiver;
   transforming the second chaotic signal received at the receiver according to the inverse of the second chaotic algorithm for each kth-second chaotic signal generator to generate a plurality of inversely transformed second chaotic signals;
   matching the second chaotic signal with the plurality of transformed first chaotic signals; and
   assigning the transmitted value according to the closest match between the second chaotic signal and the plurality of transformed first chaotic signals.

4. The method as claimed in claim 1, wherein the first chaotic signal includes a series of numbers sent within the first portion of the bit period.

5. The method as claimed in claim 4, wherein the first chaotic signal is generated by the steps of:
   inputting a random number to the first chaotic algorithm to generate a first chaotic number;
   inputting the first chaotic number to the first chaotic algorithm to generate a second chaotic number; and
   repeating the step b) using the second chaotic number as the first chaotic number until all numbers to be transmitted within the first portion of the bit period are generated.

6. The method as claimed in claim 5, wherein the first chaotic algorithm is $y=4x^3-3x$, x is an input number, and y is one of the numbers forming the first chaotic signal.

7. A method as claimed in claim 1, wherein M equals to 2, and each digit has a value of either 0 or 1.

8. A method for transmitting the value k in a system for transmitting a digital message having N digits, each of said N digits having any one of M values, and wherein each of said M values k corresponds with a kth-second chaotic signal generator associating with a k-second chaotic algorithm, and is transmitted within a single bit period as a chaotic signal comprising a first chaotic signal and a second chaotic signal, the bit period being divided into a first portion and a second portion, the method comprising the steps of:
   generating the first chaotic signal from a first chaotic signal generator by a first chaotic algorithm, and transmitting the first chaotic signal in the first portion of the bit period;
   selecting the corresponding kth-second chaotic signal generator from at least two second chaotic signal generators;
   feeding the first chaotic signal to the kth-second chaotic signal generator to generate a second chaotic signal, and transmitting the second chaotic signal in the second portion of the bit period.

9. The method as claimed in claim 8, wherein the first chaotic signal includes a series of numbers sent within the first portion of the bit period.

10. The method as claimed in claim 9, wherein the first chaotic signal is generated by the steps of:
   inputting a random number to the first chaotic algorithm to generate a first chaotic number;

inputting the first chaotic number to the first chaotic algorithm to generate a second chaotic number; and repeating the step b) using the second chaotic number as the first chaotic number until all numbers to be transmitted within the first portion of the bit period are generated.

11. The method as claimed in claim 10, wherein the first chaotic algorithm is $y=4x^3-3x$, x is an input number, and y is one of the numbers forming the first chaotic signal.

12. A method for receiving the value k in a system for transmitting and receiving a digital message having N digits, each of said N digits having any one of M values, and wherein each of said M values k corresponds with a kth-second chaotic signal generator having chaotic characteristic value associating with a k-second chaotic algorithm to generate a second chaotic signal, said chaotic signal being transmitted within a bit period as a chaotic signal comprising a first chaotic signal and a second chaotic signal, the bit period being divided into a first portion and a second portion, the method including the steps of
(i) receiving the first and second chaotic signals at a receiver;
(ii) separating, via a switch, the received first and second chaotic signals which have been transmitted within each single bit period; and
(iii) demodulating the separated first and second chaotic signals to generate the transmitted value k.

13. The method as claimed in claim 12, wherein the chaotic signal is demodulated by the demodulating algorithm by the steps of:
separating the first and second chaotic signals received at the receiver;
transforming the second chaotic signal received at the receiver according to the inverse of the second chaotic algorithm for each of the second chaotic signal generators to generate a plurality of inversely transformed second chaotic signals;
matching the first chaotic signal with the plurality of inversely transformed second chaotic signals; and
assigning the transmitted value according to the closest match between the first chaotic signal and the plurality of inversely transformed second chaotic signals.

14. The method as claimed in claim 12, wherein the chaotic signal is demodulated by the demodulating algorithm by the steps of:
separating the first and second chaotic signals received at the receiver;
transforming the first signal received at the receiver according to the second chaotic algorithm for each of the second chaotic signal generators to generate a plurality of transformed first chaotic signals;
matching the second chaotic signal with the plurality of transformed first chaotic signals; and
assigning the transmitted value according to the closest match between the second chaotic signal and the plurality of transformed first chaotic signals.

15. A system for transmitting and receiving a digital message having N digits, each of said N digits having any one of M values, and wherein each of said M values k is transmitted within a bit period, the bit period being divided into a first portion and a second portion, said system including:
(i) a transmitter having a first chaotic signal generator and M second chaotic signal generators, each of said M second chaotic signal generators corresponding to one of the M values k and associating with a kth-second chaotic algorithm; and wherein
(a) a chaotic signal representing the value k and comprising a first chaotic signal and a second chaotic signal is capable of being transmitted within a single bit period, the bit period being divided into a first portion and a second portion,
(b) said first chaotic signal is generated from the first chaotic signal generator by a first chaotic algorithm, and
(c) said second chaotic signal is generated by a corresponding kth-second chaotic signal generator using the first chaotic signal as an input; and
(ii) a receiver storing chaotic characteristic values of all of the chaotic signal generators, the receiver including a switch for separating the received first and second chaotic signal which have been transmitted within each bit period, and a demodulator for executing a demodulating algorithm so as to demodulate the separated first and second chaotic signals to generate the value k.

16. The system as claimed in claim 15, wherein the demodulator incorporates a demodulating algorithm to demodulate the chaotic signal by the steps of:
separating the first and second chaotic signals received at the receiver;
transforming the second chaotic signal received at the receiver according to the inverse of the second chaotic algorithm for each kth-second chaotic signal generator to generate a plurality of inversely transformed second chaotic signals;
matching the first chaotic signal with the plurality of inversely transformed second chaotic signals; and
assigning the transmitted value according to the closest match between the first chaotic signal and the plurality of inversely transformed second chaotic signals.

17. The system as claimed in claim 15, wherein the demodulator incorporates a demodulating algorithm to demodulate the chaotic signal by the steps of:
separating the first and second chaotic signals received at the receiver;
transforming the second chaotic signal received at the receiver according to the inverse of the second chaotic algorithm for each kth-second chaotic signal generator to generate a plurality of inversely transformed second chaotic signals;
matching the second chaotic signal with the plurality of transformed first chaotic signals; and
assigning the transmitted value according to the closest match between the second chaotic signal and the plurality of transformed first chaotic signals.

18. The system as claimed in claim 15, wherein the first chaotic signal includes a series of numbers generated by the chaotic algorithm within the first portion of the bit period.

19. The system as claimed in claim 18, wherein the first chaotic signal generator generates the first chaotic signal by the steps of:
inputting a random number to the first chaotic algorithm to generate a first chaotic number;
inputting the first chaotic number to the first chaotic algorithm to generate a second chaotic number; and
repeating the step b) using the second chaotic number as the first chaotic number until all numbers to be transmitted within the first portion of the bit period are generated.

20. The system as claimed in claim 19, wherein the first chaotic algorithm is $y=4x^3-3x$, x is an input number, and y is one of the numbers forming the first chaotic signal.

21. The system as claimed in claim 15, wherein M equals to 2, and each digit has a value of either 0 or 1.

22. A transmitter for use in a system for transmitting and receiving a digital message having N digits, each of said N digits having any one of M values, and wherein each of said M values k is transmitted within a bit period, said transmitter having a first chaotic signal generator and M second chaotic signal generators, each of said M second chaotic signal generators corresponding to one of the M values k and associating with a kth-second chaotic algorithm, such that a chaotic signal representing the value k and comprising a first chaotic signal and a second chaotic signal is transmitted within a single bit period, the bit period being divided into a first portion and a second portion;

said first chaotic signal being generated from the first chaotic signal generator by a first chaotic algorithm; and said second chaotic signal being generated by a corresponding kth-second chaotic signal generator using the first chaotic signal as an input wherein the system includes at least two second chaotic signal generators.

23. The transmitter as claimed in claim 22, wherein the first chaotic signal includes a series of numbers within the first portion of the bit period.

24. The transmitter as claimed in claim 23, wherein the first chaotic signal generator generates the first chaotic signal by the steps of:

inputting a random number to the first chaotic algorithm to generate a first chaotic number;

inputting the first chaotic number to the first chaotic algorithm to generate a second chaotic number; and repeating the step b) using the second chaotic number as the first chaotic number until all numbers to be transmitted within the first portion of the bit period are generated.

25. The transmitter as claimed in claim 22, wherein the first chaotic algorithm is $y=4x^3-3x$, x is an input number, and y is one of the numbers forming the chaotic signal.

26. The transmitter as claimed in claim 22, wherein M equals to 2, and each digit has a value of either 0 or 1.

27. A receiver for use in a system for transmitting and receiving a digital message having N digits, each of said N digits having any one of M values, and wherein each of said M values k corresponds with a kth-second chaotic signal generator associating with a kth-second chaotic algorithm to generate a second chaotic signal, said chaotic signal being transmitted within a single bit period comprising a first chaotic signal and a second chaotic signal, said chaotic signal being generated by the steps of:

(i) generating a first chaotic signal from a first chaotic signal generator by a first chaotic algorithm, and transmitting the first chaotic signal in the first portion of the bit period;

(ii) selecting the corresponding kth-second chaotic signal generator;

(iii) feeding the first chaotic signal to the kth-second chaotic signal generator to generate a second chaotic signal, and transmitting the second chaotic signal in the second portion of the bit period wherein said receiver stores the chaotic characteristic values of all of the chaotic signal generators, the receiver including a switch for separating the received first and second chaotic signals which have been transmitted within each bit period, and a demodulator for executing a demodulating algorithm so as to demodulate the separated chaotic signals to generate the value k.

28. The receiver as claimed in claim 27, wherein the demodulator demodulates the chaotic signal by the steps of:

separating the first and second chaotic signals received at the receiver;

transforming the second chaotic signal received at the receiver according to the inverse of the second chaotic algorithm for each kth-second chaotic signal generator to generate a plurality of inversely transformed second chaotic signals;

matching the first chaotic signal with the plurality of inversely transformed second chaotic signals; and assigning the transmitted value according to the closest match between the first chaotic signal and the plurality of inversely transformed second chaotic signals.

29. The receiver as claimed in claim 27, wherein the demodulator demodulates the chaotic by the steps of:

separating the first and second chaotic signals received at the receiver;

transforming the first signal received at the receiver according to the second chaotic algorithm for each of the second chaotic signal generators to generate a plurality of transformed first chaotic signals;

matching the second chaotic signal with the plurality of transformed first chaotic signals; and assigning the transmitted value according to the closest match between the second chaotic signal and the plurality of transformed first chaotic signals.

* * * * *

UNITED STATES PATENT AND TRADEMARK OFFICE
CERTIFICATE OF CORRECTION

PATENT NO. : 7,593,531 B2  Page 1 of 1
APPLICATION NO. : 10/840601
DATED : September 22, 2009
INVENTOR(S) : Lau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1274 days.

Signed and Sealed this

Twenty-first Day of September, 2010

David J. Kappos
*Director of the United States Patent and Trademark Office*